(12) United States Patent
Kaplan

(10) Patent No.: US 12,079,766 B2
(45) Date of Patent: *Sep. 3, 2024

(54) METHOD AND A SYSTEM FOR NOTIFYING A USER ABOUT AN ESTIMATED TIME OF CONSUMPTION OF A PRODUCT

(71) Applicant: ImpacX.io Ltd., Rehovot (IL)

(72) Inventor: Nimrod Kaplan, Ness Ziona (IL)

(73) Assignee: WATER.IO LTD, Rehovot (IL)

(*) Notice: Subject to any disclaimer, the term of this patent is extended or adjusted under 35 U.S.C. 154(b) by 0 days.

This patent is subject to a terminal disclaimer.

(21) Appl. No.: 17/503,554

(22) Filed: Oct. 18, 2021

(65) Prior Publication Data

US 2022/0036296 A1 Feb. 3, 2022

Related U.S. Application Data

(62) Division of application No. 16/085,338, filed as application No. PCT/IL2017/050324 on Mar. 14, 2017, now Pat. No. 11,151,511.

(Continued)

(51) Int. Cl.
*G06Q 10/087* (2023.01)
*B65D 25/56* (2006.01)
(Continued)

(52) U.S. Cl.
CPC .......... *G06Q 10/087* (2013.01); *B65D 25/56* (2013.01); *B65D 51/24* (2013.01); *B65D 51/245* (2013.01);
(Continued)

(58) Field of Classification Search
CPC .......... B65D 1/00; B65D 1/02; B65D 1/0207; B65D 1/04; B65D 1/10; B65D 1/12;
(Continued)

(56) References Cited

U.S. PATENT DOCUMENTS

| 8,116,907 B2 | 2/2012 | Hyde et al. |
| 9,959,437 B1 | 5/2018 | Ramos |

(Continued)

OTHER PUBLICATIONS

International Search Report of PCT Application No. PCT/IL2017/050324, mailed Jun. 12, 2017.

(Continued)

*Primary Examiner* — William J Allen
(74) *Attorney, Agent, or Firm* — PEARL COHEN ZEDEK LATZER BARATZ LLP

(57) ABSTRACT

A system for notifying a user about an estimated time of consumption of a product includes an electronic device and a processor. The electronic device is integrated with a container of a product and configured to transmit a plurality of data relating to the amount of product in the container. The processor is configured to perform steps of a method. The method receives from the electronic device the plurality of data relating to the amount of product in the container and, based on the received plurality of data, calculates a usage pattern for the product in the container. The method calculates, based on the usage pattern, an estimated time of consumption of the product in the container, and then either notifies a user of an estimated time of consumption of the product in the container or automatically orders a refill of the product based on the estimated time of consumption.

4 Claims, 2 Drawing Sheets

Related U.S. Application Data

(60) Provisional application No. 62/307,980, filed on Mar. 14, 2016.

(51) Int. Cl.
    *B65D 51/24*     (2006.01)
    *G06Q 30/0601*     (2023.01)
    *G16Y 10/45*     (2020.01)

(52) U.S. Cl.
    CPC .......... *G06Q 30/0633* (2013.01); *G16Y 10/45* (2020.01); *B65D 2203/00* (2013.01); *B65D 2203/04* (2013.01)

(58) Field of Classification Search
    CPC ...... B65D 25/00; B65D 25/38; B65D 25/385; B65D 25/40; B65D 25/42; B65D 25/48; B65D 25/56; B65D 51/24; B65D 51/243; B67D 7/00; B67D 7/06; B67D 7/08; G16Y 10/45; G16Y 10/80; G16Y 20/20; G16Y 40/10; G06Q 30/06–0643; G06Q 10/087; G06Q 30/0201–0206
    See application file for complete search history.

(56) References Cited

U.S. PATENT DOCUMENTS

| | | |
|---|---|---|
| 2004/0172162 A1 | 9/2004 | Bonney et al. |
| 2008/0210702 A1 | 9/2008 | Lochinger et al. |
| 2009/0143900 A1 | 6/2009 | Hyde et al. |
| 2013/0222135 A1 | 8/2013 | Stein et al. |
| 2013/0275075 A1 | 10/2013 | Johnson |
| 2014/0236351 A1 | 8/2014 | Hyde et al. |
| 2014/0266760 A1 | 9/2014 | Burke, Jr. |
| 2015/0120421 A1 | 4/2015 | Deshpande |
| 2015/0182797 A1 | 7/2015 | Wernow et al. |
| 2016/0140526 A1 | 5/2016 | Cummins |
| 2017/0046773 A1 | 2/2017 | Hendricks, II |
| 2019/0295150 A1 | 9/2019 | High |
| 2021/0094735 A1* | 4/2021 | Bentkovski .......... G01F 23/802 |

OTHER PUBLICATIONS

Extended Search report for European Patent Application No. 17765988.5, mailed Jan. 10, 2019.

Amazon Activates Dash replenishment Service on select gadgets. Natalie Gagliordi. For Between the Lines. Jan. 19, 2016. (Year: 2016).

Amazon adds GE, Samsung, Oster as Dash hardware partners. Larry Dignan. For Between the Lines. Oct. 1, 2015. (Year: 2015).

\* cited by examiner

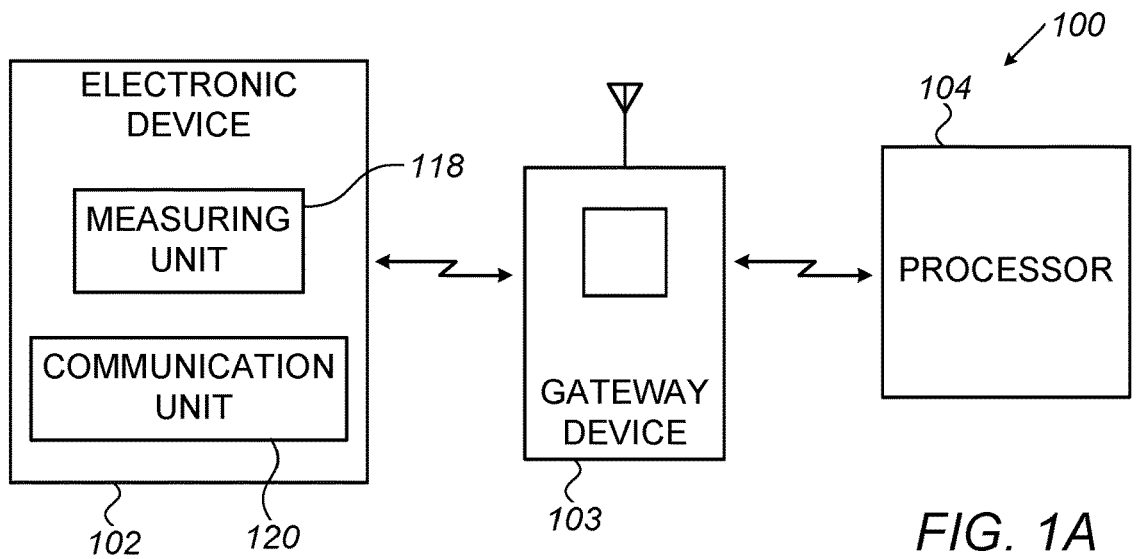
FIG. 1A
FIG. 1B
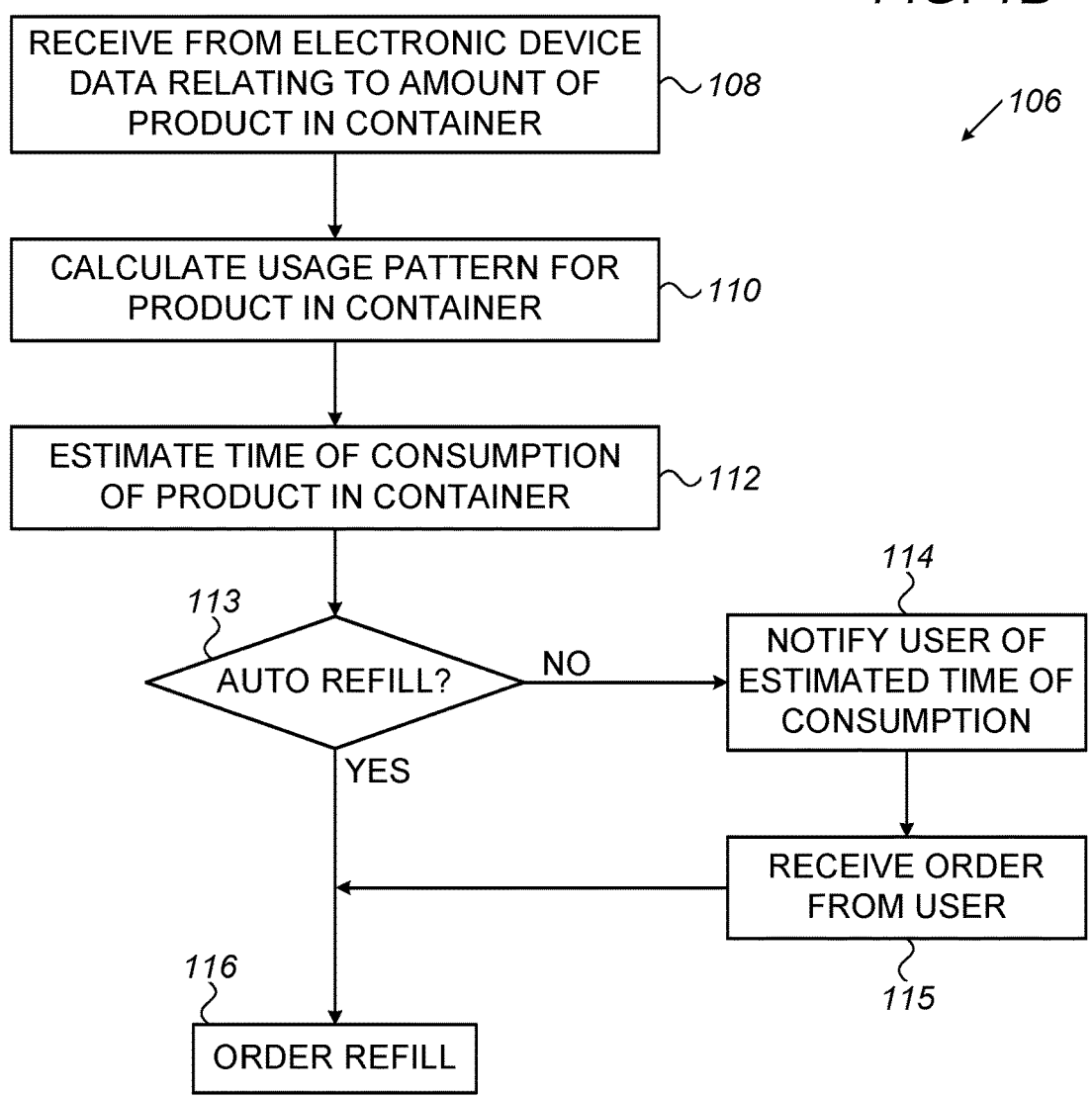

My Re-Order Alerts
*FIG. 2*
*FIG. 3*
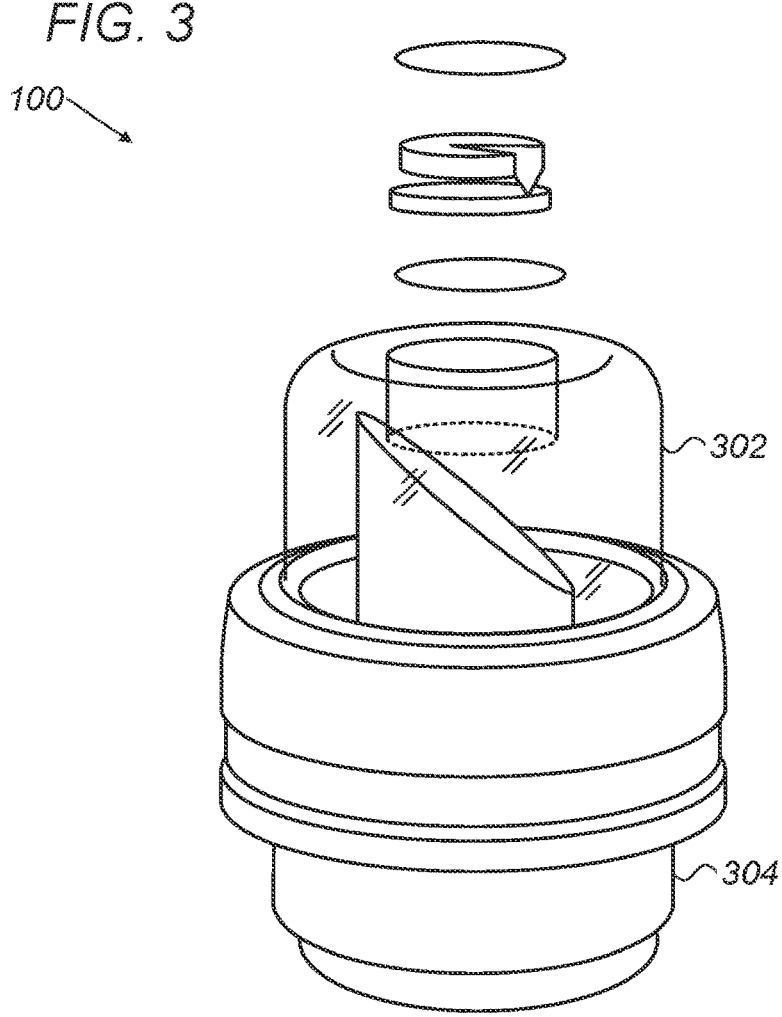

METHOD AND A SYSTEM FOR NOTIFYING A USER ABOUT AN ESTIMATED TIME OF CONSUMPTION OF A PRODUCT

CROSS REFERENCE TO RELATED APPLICATIONS

This application is a divisional of U.S. patent application Ser. No. 16/085,338, filed on Sep. 14, 2018 as a National Phase Application of PCT International Application No. PCT/IL2017/050324, International Filing Date Mar. 14, 2017, which claimed the benefit of U.S. Provisional Patent Application No. 62/307,980, filed on Mar. 17, 2016, which is hereby incorporated by reference.

FIELD OF THE INVENTION

The present invention generally relates a method and a system for reordering consumer goods products, and more particularly, relates to a method and a system for notifying a user about an estimated time of consumption of a product at a user.

BACKGROUND OF THE INVENTION

In the current busy life, consumers are looking for fast and simple method to simplify everyday life tasks, and make them easier simpler and faster. Using the internet, Smart-Phone, SmartPhone Apps, Laptop, Emails, instant messaging and other new technologies, tasks that took few hours in the past can now be completed in minutes or even seconds.

One of our daily or weekly task is purchasing products form stores, for example—food, dietary, personal care, home care consumer goods products. Consumers are trying to buy new ones before the previous one is running out. Traditionally, we have to visit stores for purchasing such products.

Nowadays with advancements in technology, we are able to purchase products online. So, we have to look for the product about to be consumed online and then we need to make the order. With the emerging market trends, the e-commerce portals are trying to fetch data that knows when the person last purchased a particular product and then reminding the consumer again after some time.

Therefore, there is a need of a method and a system for notifying a user about an estimated time of consumption of a product at a customer. Further, the method and the system should allow automatic and semi-automatic reordering of consumer goods products so that the products are not suddenly running out, without notification or reordering of the product automatically.

SUMMARY OF EMBODIMENTS OF THE INVENTION

In accordance with teachings of the present invention, a method and a system for notifying a user about an estimated time of consumption of a product is provided.

An object of the present invention is to provide a system for notifying a user about an estimated time of consumption of a product. The system may include an electronic device, and a processor. The electronic device may be integrated with a portion of a container of a product and configured to transmit a plurality of data relating to the amount of product in the container.

The processor may be configured to perform steps of a method. The method may be initiated with a step to receive from the electronic device a plurality of data relating to the amount of product in the container. The above step may be then followed by another step i.e. based on the received plurality of data; calculate a usage pattern for the product in the container.

The above step may be then followed by another step i.e. based on the usage pattern; calculate an estimated time of consumption of the product in the container. In some embodiments, the estimated time of consumption of the product in the container may be calculated directly from the data relating to the amount of product in the container. According to embodiments of the invention, a parameter at the processor may determine whether or not the particular product is to be automatically reordered. If the product is not to be automatic reordered, the above step may be then followed by a step to notify a user of an estimated time of consumption of the product in the container, in which case, the user may manually reorder the product. If the product is to be automatically reordered, the above step may be followed by the step of automatically ordering a refill of the product based on the estimated time of consumption.

Another object of the present invention is to provide a system wherein the electronic device may include at least one measuring unit configured to measure the amount of the product in the container. Further, the electronic device includes a communication unit to wirelessly communicate with the processor.

Another object of the present invention may be to provide the system wherein the processor may further be configured to perform a step to send a provider of the product, at least one of: the product usage pattern, estimated run out time of the product, profile of the customer and other products that the user is buying. The provider may be at least one of an ecommerce website, a retail chain and a store owner.

These and other features and advantages may become apparent from the following detailed description of illustrative embodiments thereof, which is to be read in connection with the accompanying drawings.

BRIEF DESCRIPTION OF DRAWING

FIG. 1A illustrates a block diagram of a system according to embodiments of the invention for notifying a user about an estimated time of consumption of a product;

FIG. 1B illustrates a method at a remote processor for reordering a product in a container according to embodiments of the invention;

FIG. 2 illustrates a screenshot of a software application showing notifying of an estimated time of consumption of the product in the container in accordance with an embodiment of the present invention; and FIG. 3 illustrates a side view of the electronic device integrated into the cap of a container in accordance with an embodiment of the present invention.

DETAILED DESCRIPTION OF DRAWINGS

While this technology is illustrated and described in a preferred embodiment a system for notifying a user about an estimated time of consumption of a product may be produced in many different configurations, shapes, sizes, forms, materials and computer languages. There is depicted in the drawings, and will herein be described in detail, as a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the technology described herein.

FIG. 1A illustrates a block diagram of a system 100 for notifying a user about an estimated time of consumption of a product. The system 100 may include an electronic device 102 and a processor 104. In addition, the system may use a gateway device 103. The electronic device 102 may be integrated with a portion of a container of a product (e.g., the cap). The electronic device 102 may further be configured to transmit plurality of data relating to the amount of product in the container, as well as information about the product or container.

The electronic device 102 may include a measuring unit and/or sensor 118 configured to measure the amount of the product in the container and a communication unit 120. Example of the measuring unit 118 includes but not limited to an optical level sensor, ultrasonic sensor, capacitive sensor, a pressure sensor, computer vision, etc.

For example, the measuring unit 118 may measure the content left inside the product container, consumption of the product in single use, container status (e.g., cap open or closed), product usage, etc. The electronic device 102 may be attached to or integrated with a product container or a portion thereof, such as including but not limited to shampoo container, cosmetic items, food items, etc.

For example, the electronic device 102 may be attached to or integrated with the cap of the product container and may measure the quantity of the product in the container.

The communication unit 120 may be configured to wirelessly communicate with the processor 102 indirectly via a gateway device 103. Examples of the protocol used by communication unit 120 include but are not limited to Bluetooth, Bluetooth smart, BLE, Li-Fi, Wi-Fi, ANT, Zig-Bee, near field communication, or any other standardized or proprietary communication protocol and/or frequency (band). Examples of near field communication includes but not limited to magnetic NFC, Radio-frequency identification (RFID). Examples of the sonic/ultrasonic technology includes but not limited to communication over audible or inaudible frequency. Gateway device 103 may be any device capable of receiving data from the electronic device 102, using the above protocols, and communicating the data to remote processor 104, for example, via a network, such as the Internet, or a mobile network such as a cellular network (using, e.g., LTE). Examples of gateway devices include smartphone, laptop, an access point, a smart home gateway, a voice-activated assistant device (e.g., Amazon Echo, Google Home, etc.).

FIG. 1B is an illustration of a method 106 performed by processor 104, e.g., at a remote server. The method 106 may be initiated with a step 108 to receive from the electronic device the plurality of data relating to the amount of product in the container. The data relating to the amount of product in the container may be received from measuring unit 118. For example, the data relating to the amount of product in the container may include a level of the product (e.g., a liquid product) measured by an optical sensor. The step 108 may then be followed by a step 110 to, calculate based on the received plurality of data a usage pattern for the product in the container.

In some embodiments, the processor 104 may determine (e.g., calculate or update) the usage pattern for the product in the container by calculating product time difference in between usages, and the amount of product consumed within the first usage and the second usage of the product.

It will be understood that in some embodiments, step 110 may be omitted as unnecessary. The step 110 (or step 108) may be then followed by a step 112 to based on the usage pattern, calculate an estimated time of consumption of the product in the container.

In some embodiments, of the present invention, the calculation may be performed using various algorithms such as machine learning, pattern recognition, prediction, and consumer behavior analysis. The step 112 may be then followed by either a step 113 to determine whether there is an automatic refill ordering of the particular product. If not, at step 114, the processor may notify a user of an estimated time of consumption of the product in the container. The user may order a refill, and the order for refill be received at step 116. Then, either based on automatic reordering, or a received refill order, the processor may at step 116 order a refill of the product (e.g., timed based on the estimated time of consumption if on automatic reorder, or based on a received order).

In some embodiments, of the present invention, the method may further include a step to send a provider of the product, at least one of: the product usage pattern, estimated run out time of the product, profile of the customer and other products that the user is buying. Examples of the provider includes but not limited to an ecommerce website, a retail chain and a store owner.

In some embodiments, of the present invention, the electronic device 102 may store information related to product, such as, manufacturer, product, product type, production batch number and expiry date. In some embodiments, some or all of this information may be transferred to the provider.

For example, the processor 104 may then determine that the product is about to expire in 4 days as per the current usage pattern. Further, the processor 104 may send the information to either the user or the web portal or the product company.

In some embodiments, the estimated time of consumption of the product may help the user to order in advance before complete consumption of the product. The estimated time of consumption of the product may help the web portal to automatically manage in re-ordering of the product for the user. The web portal may allow the user to select an option on the web portal to automatically or semi-automatically reordering of the product.

For example, the e-commerce portal may then allow the consumer to re-order the product either automatically on completely consuming of the product. In semi-automatically mode, the user may be notified about the consumption of the product. Then, on approval the product from the user, the product may be added to the shopping list.

In some embodiments, the estimated time of consumption of the product in the container may help the product manufacture to estimate nearest production capacity, local consumer goods wholesaler to estimate their upcoming orders from the manufacturer, delivery companies to plan their upcoming delivery route and further assists in synchronizing in between the product manufacturer, distributer and the delivery companies.

For example, the processor 104 may send various information to the product company including but not limited to product usage pattern, estimated run out time of the product, profile of the customer (age, behavior, geographic location etc), cross analytics with other products that the user is buying, and cross analytics with similar consumers profile (for suggesting other products) etc.

FIG. 2 is a screenshot 200 of a software application operating on a smartphone, e.g., the gateway device, showing notifying of an estimated time of consumption of the product in the container in accordance with an embodiment of the present invention. The screenshot 200 shows an estimated time of consumption 202 of each product 204. The smartphone may receive data from the electronic device and transmit the data to the remote processor. The user may receive calculations and estimations of the processor (e.g., estimated time to completion of the product), and may manually reorder product, as well as access settings, such as which products are to be automatically reordered.

For exemplary purposes as shown in FIG. 2, the SHAMPOO 206 is expected to be consumed in 2 days and the OIL 208 is expected to be consumed in 4 days. This allows the user to re-order the products before complete consumption of the product. Further in another preferred embodiment of the present invention, the estimated time of consumption 202 is also notified to the web portal. Thus, web portal may communicate with the user for re-orders.

FIG. 3 illustrates a side view of the device 102 integrated with the cap 302 of the container 304 in accordance with an embodiment of the present invention. The device 102 is able to determine data relating to the amount of product in the container 304.

Example of the data includes but not limited to quality of product, weight of product, quantity of product. It would be readily apparent to those skilled in the art that various types of data may be envisioned using the system 100 without deviating from the scope of the present invention.

Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

The invention claimed is:

1. A method comprising:
   providing an electronic device integrated with a cap of a container of a product, wherein the electronic device comprises a sensor configured to periodically measure an amount of product in the container and determine information regarding times when the cap is opened and when the cap is closed, and is configured to transmit data and information;
   periodically measuring, by the sensor, the amount of product in the container and determining information regarding times when the cap is opened and when the cap is closed;
   periodically transmitting, by the electronic device to a processor, the amount of product in the container measured by the sensor and the information regarding times when the cap is opened and when the cap is closed determined by the sensor;
   determining by the processor, based on the periodically transmitted amount of product in the container and information regarding times when the cap was opened and when the cap was closed:
      a first amount of product consumed from the container within a first usage of the container, and
      a second amount of product consumed from the container within a second usage of the container,
   calculating, by the processor, a usage pattern for consumption of the product from the container based on at least the first amount of the product consumed, the second amount of the product consumed, and an amount of time difference in between the first usage and the second usage of the container;
   calculating by the processor, based on the usage pattern and the amount of product in the container, an estimated run-out time of the product in the container; and
   based on an automatic-refill parameter, performing at least one of:
      notifying a user of the estimated run-out time of the product in the container and
      automatically ordering a refill of the product based on the estimated run-out time.

2. The method of claim 1, further comprising sending a provider of the product at least one of: the product usage pattern; the estimated run-out time of the product; profile of the customer; and other products that the user is buying.

3. The method of claim 1, wherein the provider is at least one of: an ecommerce website, a retail chain and a store owner.

4. A computer system comprising:
   an electronic device integrated with a cap of a container of a product, wherein the electronic device comprises a sensor configured to periodically measure the amount of product in the container, and determine information regarding times when the cap is opened and when the cap is closed, and wherein the electronic device is configured to transmit the amount of product in the container measured by the sensor and the information regarding times when the cap is opened and when the cap is closed determined by the sensor; and
   a processor configured to:
      periodically receive, from the electronic device integrated with a cap of a container of a product:
         the amount of product in the container measured by a sensor of the electronic device, and
         the information regarding times when the cap is opened and when the cap is closed determined by the sensor of the electronic device;
      based on the periodically received amount of product in the container and information regarding times when the cap was opened and when the cap was closed, determine:
         a first amount of product consumed from the container within a first usage of the container, and
         a second amount of product consumed from the container within a second usage of the container,
      calculate a usage pattern for consumption of the product from the container based on at least the first amount of the product consumed, the second amount of the product consumed, and an amount of time difference in between the first usage and the second usage of the container;
      based on the usage pattern and the amount of product in the container, calculate an estimated run-out time of the product in the container; and
      based on an automatic-refill parameter, perform at least one of:
         notify a user of the estimated run-out time of the product in the container; and
         automatically order a refill of the product based on the estimated run-out time.

* * * * *